(12) United States Patent
Park et al.

(10) Patent No.: US 11,422,405 B2
(45) Date of Patent: Aug. 23, 2022

(54) LIGHT CONVERSION FILM, BACKLIGHT UNIT AND DISPLAY DEVICE

(71) Applicant: LG Display Co., Ltd., Seoul (KR)

(72) Inventors: GwanHoon Park, Paju-si (KR); SangChul Ryu, Paju-si (KR); DongSeok Lee, Paju-si (KR); Suhun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/950,533

(22) Filed: Nov. 17, 2020

(65) Prior Publication Data
US 2021/0157204 A1 May 27, 2021

(30) Foreign Application Priority Data
Nov. 25, 2019 (KR) .................. 10-2019-0152021

(51) Int. Cl.
G02F 1/00 (2006.01)
G02F 1/13357 (2006.01)
G02F 1/1335 (2006.01)

(52) U.S. Cl.
CPC .. G02F 1/133603 (2013.01); G02F 1/133605 (2013.01); G02F 1/133606 (2013.01); G02F 1/133614 (2021.01)

(58) Field of Classification Search
CPC ......... G02F 1/133603; G02F 1/133605; G02F 1/133615
See application file for complete search history.

(56) References Cited

U.S. PATENT DOCUMENTS

| | | | |
|---|---|---|---|
| 9,570,424 B2* | 2/2017 | Nam | H01L 25/0753 |
| 2009/0073350 A1* | 3/2009 | Toyama | G02F 1/133611 349/69 |
| 2009/0180282 A1* | 7/2009 | Aylward | G02B 6/0076 362/245 |
| 2011/0128721 A1* | 6/2011 | Cheong | G02F 1/133603 362/97.1 |
| 2011/0228193 A1* | 9/2011 | Shin | F21V 11/00 349/61 |
| 2012/0224111 A1* | 9/2012 | Ohshima | G02F 1/133606 348/790 |

(Continued)

FOREIGN PATENT DOCUMENTS

| | | |
|---|---|---|
| TW | 201834852 A | 10/2018 |
| TW | 201915567 A | 4/2019 |

*Primary Examiner* — Gerald J Sufleta, II
(74) *Attorney, Agent, or Firm* — Birch, Stewart, Kolasch & Birch, LLP

(57) ABSTRACT

Embodiments of the present disclosure relate to a light conversion film, a backlight unit and a display device, and according to the embodiments, white light can be produced by a simplified configuration and be uniformly provided to a panel by disposing, over areas corresponding to light sources, patterns changing traveling paths of light emitted from a light source and patterns converting wavelengths of light. Further, by allowing a base film to provide a function of guiding light by disposing, over a light source, the base film on which a light path change pattern and a color conversion pattern are disposed to be adjacent to the light source, it is possible to minimize a thickness of the backlight unit and enhance image quality presented by illumination of the backlight unit.

20 Claims, 13 Drawing Sheets

(56) References Cited

U.S. PATENT DOCUMENTS

| | | | |
|---|---|---|---|
| 2012/0250350 A1* | 10/2012 | Kim | G02F 1/133606 |
| | | | 362/606 |
| 2014/0204578 A1* | 7/2014 | Kim | F21V 7/00 |
| | | | 362/235 |
| 2014/0233212 A1* | 8/2014 | Park | G02F 1/133617 |
| | | | 362/84 |
| 2015/0077990 A1* | 3/2015 | Park | G02B 6/0078 |
| | | | 362/235 |
| 2015/0219936 A1* | 8/2015 | Kim | G02F 1/133602 |
| | | | 362/97.1 |
| 2015/0346551 A1* | 12/2015 | Sun | G02F 1/133608 |
| | | | 362/97.1 |
| 2017/0017120 A1* | 1/2017 | Choi | G02F 1/133603 |
| 2018/0136520 A1* | 5/2018 | Kim | H01L 25/0753 |
| 2018/0182940 A1* | 6/2018 | Yamamoto | H01L 33/60 |
| 2018/0356685 A1 | 12/2018 | Jang et al. | |
| 2019/0094619 A1* | 3/2019 | Park | G02F 1/133605 |
| 2019/0129249 A1* | 5/2019 | Lee | G02F 1/133605 |
| 2019/0146274 A1 | 5/2019 | Kuniyasu et al. | |
| 2019/0301709 A1* | 10/2019 | Chen | F21V 9/38 |
| 2019/0349685 A1* | 11/2019 | Choi | G02F 1/133605 |
| 2020/0089057 A1* | 3/2020 | Watanabe | G02B 6/0055 |
| 2020/0133078 A1* | 4/2020 | Kim | G02F 1/133514 |
| 2020/0159078 A1* | 5/2020 | Watanabe | G02F 1/136209 |
| 2021/0200030 A1* | 7/2021 | Yoon | G02F 1/133603 |

\* cited by examiner

LIGHT CONVERSION FILM, BACKLIGHT UNIT AND DISPLAY DEVICE

CROSS-REFERENCE TO RELATED APPLICATION

This application claims the priority benefit of Korean Patent Application No. 10-2019-0152021, filed on Nov. 25, 2019 in the Korean Intellectual Property Office, the disclosure of which is incorporated herein by reference in its entirety into the present application.

BACKGROUND

1. Technical Field

The present disclosure relates to a light conversion film, a backlight unit, and a display device.

2. Description of the Related Art

As the information society has developed, there are increasing needs for display devices displaying images. Recently, various types of display devices, such as a liquid crystal display device, an organic light emitting display device, a quantum dot display device, and the like, have been developed and utilized.

The display device can include a display panel on which a plurality of sub-pixels is arranged, and several types of driving circuits for driving elements arranged in the sub-pixels. According to the types of the display devices, display devices can be provided with a backlight unit providing light to the display panel.

The backlight unit can include a plurality of light sources, and several optical elements. Further, the backlight unit is typically located on an opposite side of a surface on which the display panel presents images, so that it can provide backlight to the display panel.

Thus, the backlight unit included in the display panel can lead the thickness of the display device to increase. Further, when reducing the thickness of the backlight unit to reduce the thickness of the display device, since a sufficient optical gap between a light source and a display panel may not be formed, there in turn occurs a problem that image quality can be degraded.

SUMMARY OF THE INVENTION

In accordance with embodiments of the present disclosure, a method is provided for improving image quality presented by the illumination of a backlight unit, while reducing a thickness of the backlight unit providing light to a display panel.

In accordance with embodiments of the present disclosure, a method is provided for reducing one or more elements included in a backlight unit, simplifying a structure in which such elements are disposed, and improving image quality presented by the illumination of the backlight unit, In accordance with one aspect of the present disclosure, a backlight unit is provided that includes a plurality of light sources disposed on a printed circuit, at least one light source protective element located on one or more of the plurality of light sources, a base film located on the at least one light source protective element, a plurality of first light conversion patterns that is disposed on at least one of both surfaces of the base film and located in respective areas corresponding to the plurality of light sources, and changes traveling paths of at least some of incident light, and a plurality of second light conversion patterns that is disposed on at least one of both surfaces of the first light conversion patterns and converts wavelengths of at least some of incident light.

In accordance with another aspect of the present disclosure, a backlight unit is provided that includes a plurality of light sources disposed on a printed circuit, at least one light source protective element located on one or more of the plurality of light sources, a base film located on the at least one light source protective element, a plurality of first light conversion patterns located in respective areas corresponding to the plurality of light sources on at least one of both surfaces of the base film, and changing traveling paths of at least some of incident light, and a plurality of second light conversion patterns located in respective areas corresponding to the plurality of light sources on at least one of both surfaces of the base film, and converting wavelengths of at least some of incident light.

In accordance with further another aspect of the present disclosure, a display device is provided that includes the backlight unit according to the embodiments described above, and a panel disposed over the backlight unit and receiving light from the backlight unit.

In accordance with further another aspect of the present disclosure, a backlight unit is provided that includes a base film, a plurality of first light conversion patterns distributed and disposed on at least one of both surfaces of the base film, and changing traveling paths of at least some of incident light, and a plurality of second light conversion patterns disposed on at least one of both surfaces of the plurality of first light conversion patterns, and converting wavelengths of at least some of incident light.

In accordance with embodiments of the present disclosure, it is possible to provide a backlight unit capable of uniformly providing white light to a display panel without disposing a color conversion sheet by disposing patterns changing traveling paths of at least some of incident light and patterns converting wavelengths of at least some of incident light over one or more light sources of the backlight unit.

Further, in accordance with embodiments of the present disclosure, it is possible to reduce a thickness of the backlight unit and to enhance image quality presented by the illumination of the backlight unit by allowing a base film to have a light guide function by disposing the base film, on which a light conversion pattern is disposed, between a light source and an optical element.

THE DETAILED DESCRIPTION OF THE EMBODIMENTS

Figure 1:
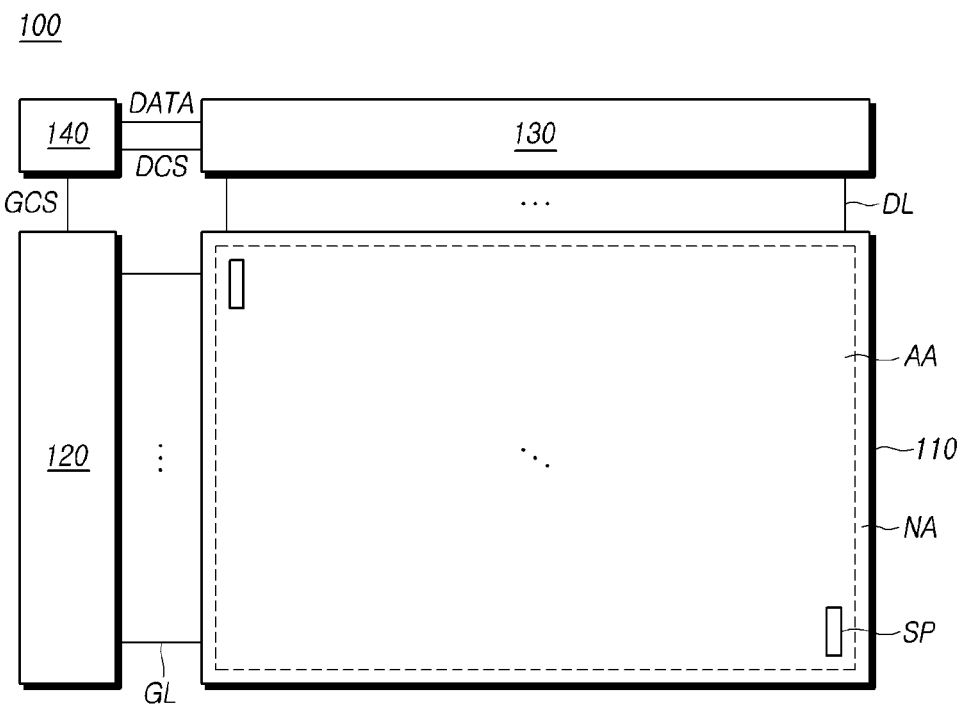
FIG. 1 is schematically illustrates a configuration of a display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description can make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

FIG. 1 is a block diagram illustrating a display device 100 according to embodiments of the present disclosure. All the components of the display device 100 according to all embodiments of the present disclosure are operatively coupled and configured.

Referring to FIG. 1, the display device 100 includes a display panel 110 including an active area AA and a non-active area NA; a gate driving circuit 120, a data driving circuit 130, and a controller 140, for driving the display panel 110; and the like.

A plurality of data lines DL and a plurality of gate lines GL can be arranged in the display panel 110, and a plurality of subpixels SP can be arranged in areas defined by intersections of the data lines DL and the gate lines GL.

The gate driving circuit 120 is controlled by the controller 140, and controls driving timings of the plurality of subpixels by sequentially outputting scan signals to the plurality of gate lines GL arranged in the display panel 110.

The gate driving circuit 120 can include one or more gate driver integrated circuits GDIC. The gate driving circuit 120 can be located on one side or both sides of the display panel 110, such as, a left or right side, a top or bottom side, the left and right sides, or the top and bottom sides, according to a driving scheme.

Each gate driver integrated circuit GDIC can be connected to a pad, such as a bonding pad, of the display panel 110 in a Tape Automated Bonding (TAB) type or a Chip On Glass (COG) type, or be directly disposed on the display panel 110 in a Gate In Panel (GIP) type. In some instances, the gate driver integrated circuit GDIC can be disposed to be integrated into the display panel 110. Each gate driver integrated circuit GDIC can be implemented in a Chip On Film (COF) type, which is mounted on a film connected to the display panel 110.

The data driving circuit 130 receives image data from the controller 140 and then converts the received image data into analog data voltages. The data driving circuit 130 outputs a data voltage to each data line DL according to a timing at which a scan signal through the gate line GL is applied, and enables each subpixel SP to emit light in line with the image data.

The data driving circuit 130 can include one or more source driver integrated circuits SDIC.

Each source driver integrated circuit SDIC can include a shift register, a latch circuit, a digital to analog converter, an output buffer, and the like.

Each source driver integrated circuit SDIC can be connected to a pad, such as a bonding pad, of display panel 110 in the Tape Automated Bonding (TAB) type or the Chip On Glass (COG) type, or be directly disposed on the display panel 110. In some instances, the source driver integrated circuit SDIC can be disposed to be integrated into the display panel 110. Each source driver integrated circuit SDIC can be implemented in the Chip On Film (COF) type. In this case, each source driver integrated circuit SDIC can be mounted on a film connected to the display panel 110, and be electrically connected to the display panel 110 through lines on the film.

The controller 140 provides several control signals to the gate driving circuit 120 and the data driving circuit 130, and controls operations of the gate driving circuit 120 and the data driving circuit 130.

The controller 140 can be mounted on a printed circuit board (PCB), a flexible printed circuit (FPC), etc. and be electrically connected to the gate driving circuit 120 and the data driving circuit 130 through the printed circuit board (PCB), flexible printed circuit (FPC), etc.

The controller 140 enables the gate driving circuit 120 to output a scan signal according to a timing processed in each frame, converts image data input from external devices or image providing sources to a data signal form used in the data driving circuit 130, and then outputs image data resulted from the converting to the data driving circuit 130.

The controller 140 receives, in addition to the image data, several types of timing signals including a vertical synchronous signal VSYNC, a horizontal synchronous signal HSYNC, an input data enable signal DE, a clock signal CLK, etc. from other devices, networks, or systems (e.g., a host system).

The controller 140 can generate several types of control signals using the several types of timing signals received from an outside source such as the host system, and output the generated signals to the gate driving circuit 120 and the data driving circuit 130.

For example, to control the gate driving circuit 120, the controller 140 outputs several types of gate control signals GCS including a gate start pulse GSP, a gate shift clock GSC, a gate output enable signal GOE, and the like.

Here, the gate start pulse GSP is used for controlling a start timing for operating one or more gate driver integrated circuits GDIC included in the gate driving circuit 120. The gate shift clock GSC is a clock signal commonly inputted to one or more gate driver integrated circuits GDIC, and is used for controlling a shift timing of a scan signal. The gate output enable signal GOE is used for indicating timing information of one or more gate driver integrated circuits GDIC.

Further, to control the data driving circuit 130, the controller 140 outputs several types of data control signals DCS including a source start pulse SSP, a source sampling clock SSC, a source output enable signal SOE, and the like.

Here, the source start pulse SSP is used for controlling a data sampling start timing of one or more source driver integrated circuits SDIC included in the data driving circuit 130. The source sampling clock SSC is a clock signal for controlling a sampling timing of data in each source driver integrated circuit SDIC. The source output enable signal SOE is used for controlling an output timing of the data driving circuit 130.

Such a display device 100 can further include a power management integrated circuit for providing several types of voltages or currents to the display panel 110, the gate driving circuit 120, the data driving circuit 130, and the like, or for controlling the several types of voltages or currents to be provided.

Each subpixel SP can be an area defined by intersection of each of the gate lines GL and each of the data lines DL. According to a type of the display device 100, a liquid crystal or a light emitting element can be disposed in the subpixel SP.

For example, the display device 100 that is a liquid crystal display device can include a light source apparatus such a backlight unit illuminating light to the display panel 110, and a liquid crystal can be disposed in the sub-pixel SP of the display panel 110. The display device 100 can produce brightness depending on image data and display images, by adjusting an alignment of liquid crystals through electric field resulted from the applying of a data voltage to each sub-pixel SP.

Figure 2:
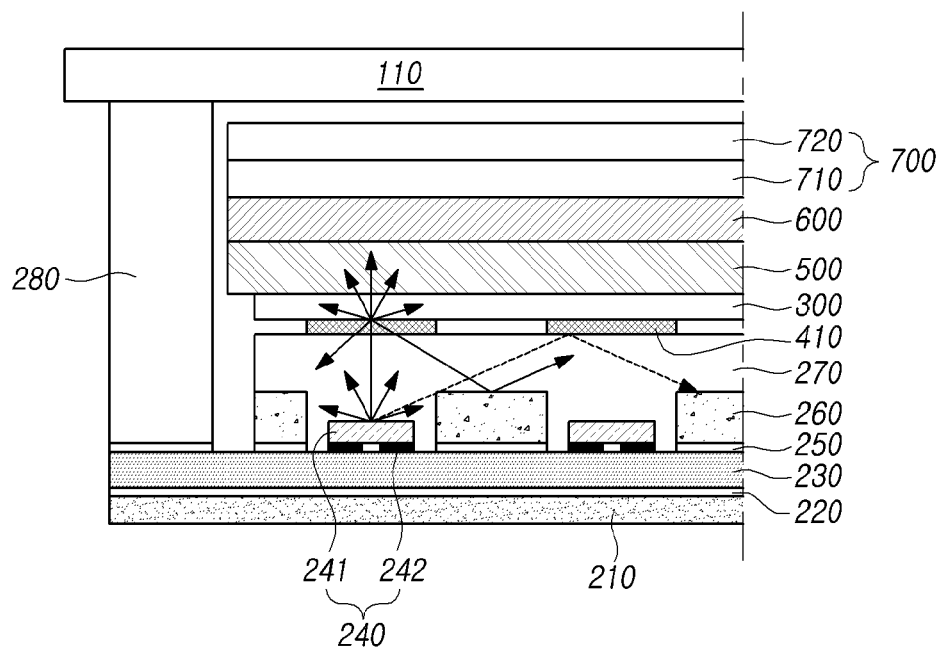
FIG. 2 illustrates an example of a backlight unit structure according to embodiments of the present disclosure.

FIG. 2 illustrates an example of a backlight unit structure included in the display device 100 according to embodiments of the present disclosure.

Referring to FIG. 2, the display device 100 can include a display panel 110, and a backlight unit disposed under the display panel 110 and providing backlight to the display panel 110.

For example, the backlight unit can include a plurality of light sources 240 disposed on a printed circuit 230. The printed circuit 230 can be disposed to be bonded with an upper surface of a plate 210 by a first adhesive tape 220.

Here, the plate 210 can be a cover bottom according to a type of the display device 100. Further, a dam 280 for supporting the display panel 110 can be disposed over the plate 210 and outside of an area in which the light sources 240, an optical element, and the like are disposed.

The light source 240 can include a light emitter 241 emitting light, and one or more electrodes 242 to which a signal for driving the light emitter 241 is applied.

Such a light source 240 can be, for example, a light emitting diode (LED), a mini LED, a μLED, or the like. Accordingly, since the light source 240 mounted on the printed circuit 230 can have a chip type, a thickness of the backlight unit can be reduced.

Such a light source 240 can emit a white light, and in some instances, emit light of a specific wavelength band. For example, the light source 240 can emit a blue light, and a white light resulted from the exciting of the blue light by an optical element disposed over the light source 240 can be provided to the display panel 110 (for example, the blue light may excite the optical element to emit light of at least one color other than blue, and white light may result from the combination of the blue light emitted from the light source 240 with the light of the at least one other color emitted by the optical element).

A reflective plate 260 can be disposed on the printed circuit 230. The reflective plate 260 can be disposed to be bonded with an upper surface of the printed circuit 230 by a second adhesive tape 250.

The reflective plate 260 can include a plurality of holes and the light source 240 can be disposed inside of at least one of the plurality of holes included in the reflective plate 260 (for example, each hole may accommodate a respective one of a plurality of light sources 240). For example, the reflective plate 260 providing a reflective function can be disposed in at least a part of an area in which the light source 240 is not disposed on the printed circuit 230.

Here, when the light source 240 having a chip type is used, since a size of the light source 240 can be small, the reflective plate 260 can have a height greater than the light source 240. For example, an upper surface of the reflective plate 260 can be placed at a higher location than an upper portion of the light source 240 disposed in the hole.

Accordingly, light traveling in a sideways direction from the light source 240 can be reflected from a side surface of the reflective plate 260 and then travel toward a front surface of the backlight unit; through this, it is possible to increase further luminous efficiency of the backlight unit.

Further, in some instances, a coated reflective film can be disposed on the printed circuit 230.

For example, a reflective film can be disposed on a front surface of the printed circuit 230 or an area except for an area in which at least one light source 240 is disposed; thus, it is possible to cause resulted luminous efficiency to increase.

In this case, the coated reflective film on the printed circuit 230 can replace the function of the reflective plate 260, or can be disposed together with the reflective plate 260 to provide the reflective function.

A light source protective element 270 can be disposed inside of at least one hole of the reflective plate 260 and on the reflective plate 260.

The light source protective element 270 can be, for example, formed of resin.

When the light source protective element 270 is formed of resin, the light source protective element 270 can be formed by disposing a partition wall in an edge area of an area in which a plurality of light sources 240 is disposed on the printed circuit 230, or on the outside of the printed circuit 230, and depositing resin inside of the partition wall.

Further, in some instances, a first light source protective element 270 in a first hole of the reflective plate 260 and a second light source protective element 270 in a second hole adjacent to the first hole can be disposed in separate structures from each other. For example, as a light source protective element 270 is disposed to expose an upper surface of a reflective plate 260, an optical element located on the light source protective element 270 can be directly disposed on the light source protective element 270 and the reflective plate 260.

The light source protective element 270 can protect one or more of a plurality of light sources 240, and provide a function of diffusing light emitted from the light sources 240. For example, the light source protective element 270 can directly contact the light sources 240 to protect the light sources 240 and provide a function of guiding light.

A base film 300 can be disposed on the light source protective element 270, and the base film 300 can be, for example, a transparent film such as PC or PET. A plurality of light path change patterns 410 can be disposed on at least one of an upper surface or a lower surface of the base film 300.

Here, a configuration including the base film 300 and the light path change patterns 410 can be regarded as a light conversion film 300. Herein, the light path change pattern 410 can be referred to as a first light conversion pattern. The plurality of light path change patterns 410 can be light control patterns, and be disposed at respective locations corresponding to a plurality of light sources 240 on the bottom surface of the base film 300.

For example, all or at least a part of each light path change pattern 410 can be disposed to overlap with each light source 240, and when taking account of diffusion characteristics of light, be disposed to overlap with an area including an area in which the light source 240 is disposed.

For example, each light path change pattern 410 can be disposed to correspond to a hole formed in the reflective plate 260. Further, in some instances, an area of a light path change pattern 410 can be identical to that of a hole of the reflective plate 260. In further another embodiment, the area of the light path change pattern 410 can be smaller, or greater, than that of a hole included in the reflective plate 260 depending on intensity of light emitted from a light source 240, a distance between the light source 240 and the light path change pattern 410, and the like.

The light path change pattern 410 can have a predetermined reflectance, and can scatter, reflect, diffract or transmit some of light emitted from the light source 240.

The light path change pattern 410 can scatter, reflect, diffract some of light emitted in a vertical direction or an inclined direction from the light source 240. Further, the light path change pattern 410 can be a light control pattern allowing some of light emitted from the light source 240 to transmit.

For example, the light path change pattern 410 can scatter light emitted from the light source 240 and cause the light to travel in a vertical direction or an inclined direction. In another embodiment, the light path change pattern 410 can cause light to travel toward an area between light sources 240 by reflecting light emitted from the light source 240 and causing the reflected light to be reflected again by the reflective plate 260.

For example, by disposing the light path change pattern 410 in an area in which the intensity of light emitted from the light source 240 is the strongest, it is possible to reduce a difference in luminance between an area in which a light source 240 is disposed (an area in which an amount of light is relatively large) and an area between light sources 240 (an area in which an amount of light is relatively small), or the like.

Thus, image quality presented by the illumination of a backlight unit can be improved by adjusting a direction in which light emitted from a light source 240 travels using the light path change pattern 410. For example, the light emitted from the light source 240 is scattered, reflected, diffracted or transmitted by the light path change pattern 410; therefore, luminance uniformity of the backlight unit can be improved.

A diffusion plate 500 can be disposed on the base film 300 to diffuse light incident through the bottom surface of base film 300.

A color conversion sheet 600 can be disposed on the diffusion plate 500 to change a wavelength range of light emitted from the light source 240. Further, one or more optical sheets 700 can be disposed on the color conversion sheet 600. For example, a prism sheet 710, a diffusion sheet 720, and the like can be disposed on the color conversion sheet 600.

Here, respective locations at which the diffusion plate 500 and the color conversion sheet 600 are disposed can be interchanged.

The diffusion plate 500 can diffuse light traveling through the base film 300.

The color conversion sheet 600 can enable light of a specific wavelength band to be emitted in response to incident light.

For example, when a light source 240 emits light of a first wavelength band (e.g., blue light), the color conversion sheet 600 can enable light of a second wavelength band (e.g., green light) and light of a third wavelength band (e.g., red light) to be emitted in response to the incident light. Accordingly, light of a white wavelength range can be provided to the display panel 110 through the color conversion sheet 600.

In some instances, such a color conversion sheet 600 can be disposed only on a partial area of the diffusion plate 500.

For example, when a light source 240 emits blue light, the color conversion sheet 600 can be disposed only in an area except for an area corresponding to an area in which the blue subpixel is disposed in a display panel 110. For example, light that has not passed through the color conversion sheet 600 can reach the blue subpixel SP of the display panel 110.

Such a color conversion sheet 600 may not be disposed depending on a light source 240.

For example, the color conversion sheet 600 may not be disposed when a light source 240 emits white light, or when a color conversion film emitting green light and red light is coated on a surface which light emitted from a light source 240 emitting blue light exits, or the like.

Like this, in accordance with embodiments of the present disclosure, a backlight unit capable of satisfying image quality can be provided while reducing a thickness of the backlight unit, by including the base film 300 on which at least one light path change pattern 410 located to correspond to a light source 240 is disposed and optical elements.

Further, the light path change pattern 410 disposed on the base film 300 can be disposed in various structures.

Figure 3:
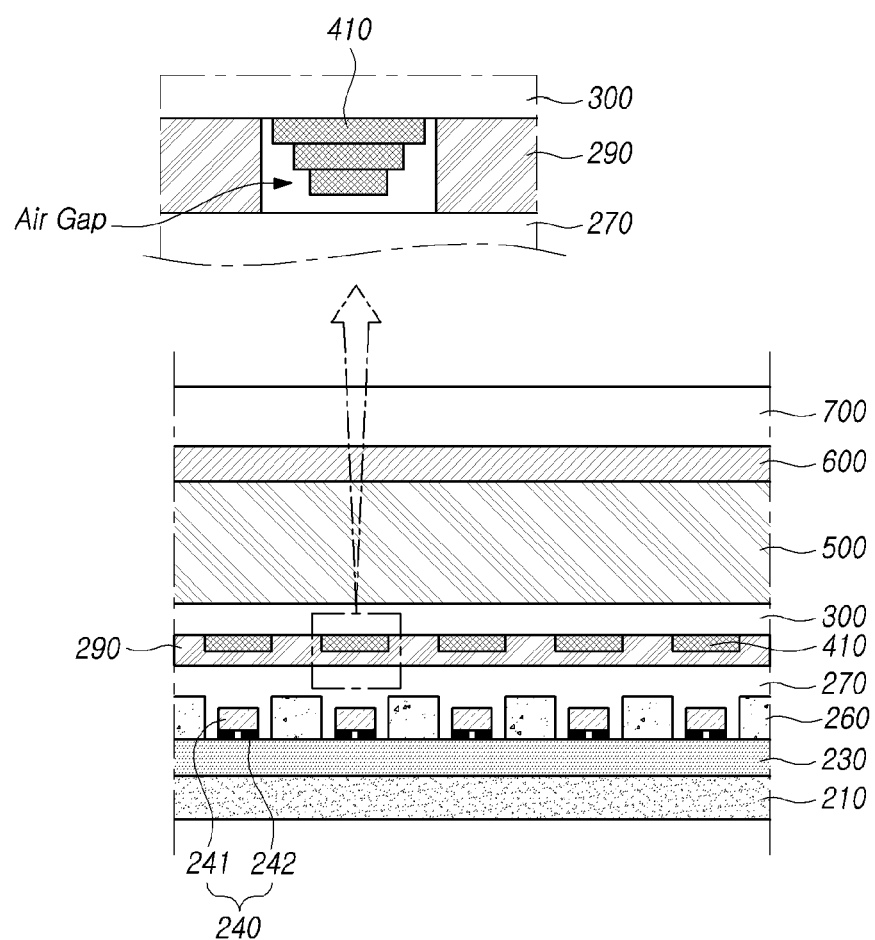
FIG. 3 illustrates an example of a structure of a light path change pattern included in a light conversion film according to embodiments of the present disclosure.

FIG. 3 illustrates an example of a structure of a light path change pattern 410 included in a light conversion film according to embodiments of the present disclosure.

Referring to FIG. 3, a printed circuit 230 can be disposed on a plate 210, and a plurality of light sources 240 can be disposed on the printed circuit 230. Further, a reflective plate 260 can be disposed in at least a part of an area except for an area in which the light sources 240 are disposed on the printed circuit 230.

Here, the light source 240 can be, for example, a light emitting diode (LED), and include a light emitter 241 including a n-type semiconductor layer, an active layer and a p-type semiconductor layer, and one or more electrodes 242.

A light source protective element 270 can be disposed on the plurality of light sources 240 and the reflective plate 260.

A base film 300 can be disposed on the light source protective element 270, and light path change patterns 410 can be disposed at respective locations corresponding to the light sources 240 on the bottom surface of the base film 300. Further, a diffusion plate 500, a color conversion sheet 600, an optical sheet 700, and the like can be disposed on the base film 300.

The light path change patterns 410 disposed on the bottom surface of the base film 300 can be implemented such that a material having properties of blocking light is printed on the base film 300.

For example, the light path change patterns 410 can be disposed using a method of printing titanium dioxide (TiO2) ink on the base film 300. When the light path change patterns 410 use TiO2 and are formed of one layer, corresponding reflectance can be 60 to 70%. Further, absorption/transmittance can be 30-40%.

Further, the light path change patterns 410 disposed on the bottom surface of the base film 300 can be formed of a single layer or multiple layers.

For example, the light path change patterns 410 can be formed of two layers, and in this case, corresponding reflectance can be 70 to 80%. Further, absorption/transmittance can be 20-30%. However, the reflectance of the light path change patterns 410 in accordance with embodiments of the present disclosure is not limited thereto. For example, when the content of TiO2 included in the light path change patterns 410 increases, or a thickness of a layer in which the light path change patterns 410 are disposed increases, the reflectance of the light path change patterns 410 can increase and the transmittance of the light path change patterns 410 can decrease.

Further, in some instances, as shown in FIG. 3, the light path change pattern 410 disposed on the bottom surface of the base film 300 can be formed of three layers.

Such a light path change pattern 410 can be implemented using a method of printing a material of blocking light on the base film 300 three times, and an area of the light blocking material to be printed can become narrower. Further, by disposing the base film 300 on which the light path change patterns 410 are disposed on the light source protective element 270 such that the light path change patterns 410 face the light source protective element 270, the light path change patterns 410 can be disposed over light sources 240.

Accordingly, an area of each light path change pattern 410 can become gradually narrower from the bottom surface of the base film 300 toward the light source protective element 270, and a thickness in a center area of the light path change pattern 410 can be greater than that in an edge area thereof.

For example, since light emitted in the vertical direction from the light source 240 has the strongest intensity, the center area of the light path change pattern 410 can be formed to have larger thickness.

Like this, by allowing a light path change pattern 410 to be disposed over a light source 240, a traveling path of light emitted in the vertical direction from the light source 240 can be changed, and a hot spot can be prevented from being produced in an area in which the light source 240 is disposed.

The base film 300 on which the light path change pattern 410 is disposed can be bonded on the light source protective element 270 by an adhesive layer 290.

The adhesive layer 290 can be, for example, an optical clear adhesive OCA.

Further, the adhesive layer 290 can be disposed in at least a part of an area except for an area in which the light path change pattern 410 is disposed in the bottom surface of the base film 300.

Accordingly, the adhesive layer 290 may not be disposed in the area in which the light path change pattern 410 is disposed, and an air gap (or an air layer) can be present between the light path change pattern 410 and the light source protective element 270.

Further, a lateral portion of the light path change pattern 410 and the adhesive layer 290 can be spaced apart from each other.

As the air gap is placed between the light path change pattern 410 and the light source protective element 270, light traveling in a sideways direction from the light path change pattern 410 can be reflected by the air gap.

For example, the light traveling in the sideways direction from the light path change pattern 410 can travel at a large refractive angle by the air layer with a low refractive index or be reflected from the air layer. Further, since the light reflected from the air layer can be reflected again by the reflective plate 260, and then can exit the backlight unit, thus, it is possible to increase luminous efficiency while supporting a light blocking function or a light path changing function of the light path change pattern 410.

Like this, through a structure in which a light path change pattern 410 and an air gap is disposed in a location corresponding to a light source 240, the luminous efficiency of the backlight unit can be improved while a hot spot is prevented from being produced.

Further, the light path change patterns 410 disposed on the bottom surface of the base film 300 can be differently formed depending on locations at which light path change patterns 410 are disposed.

Figure 4:
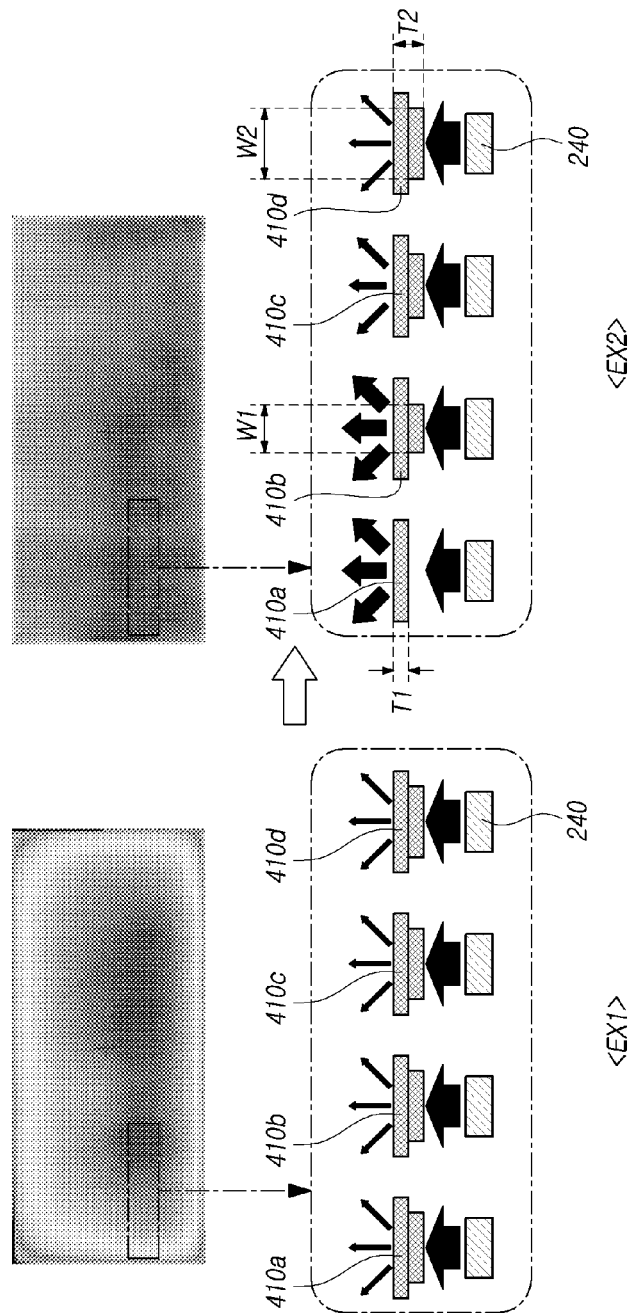
FIGS. 4 and 5 illustrate an example of structures according to locations of light path change patterns included in the light conversion film according to embodiments of the present disclosure.
Figure 5:
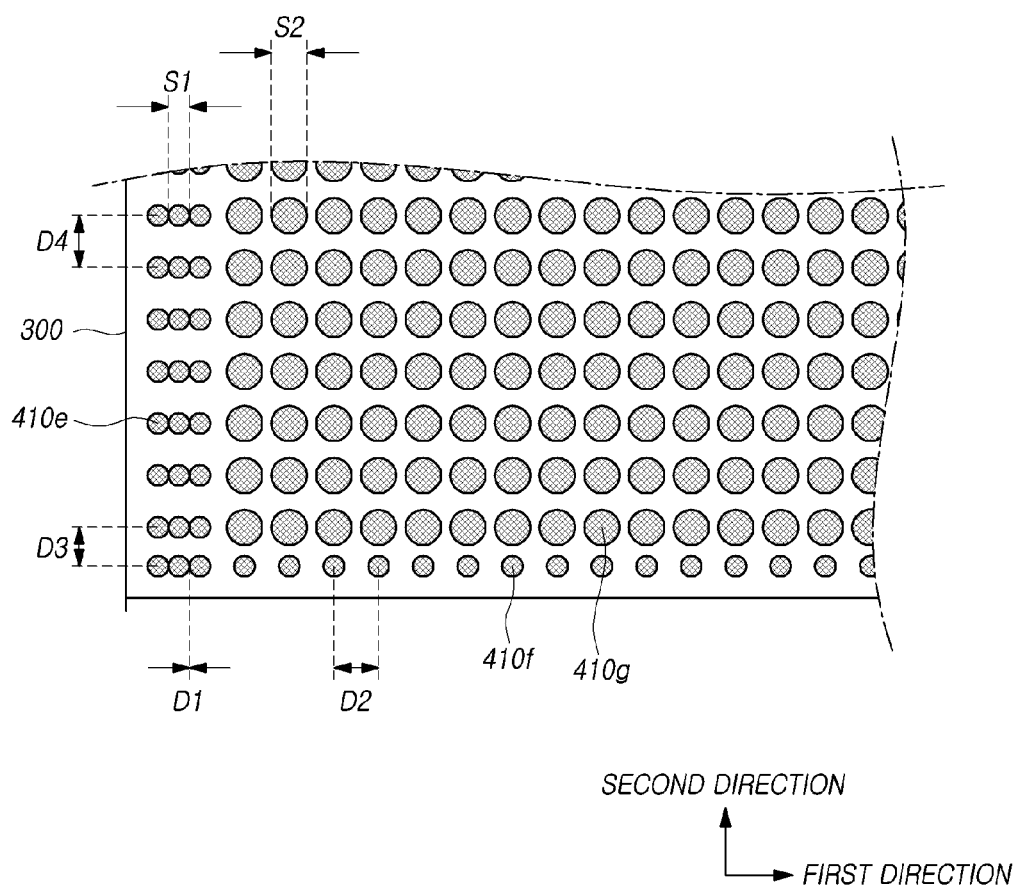

FIGS. 4 and 5 illustrate an example of structures according to locations of light path change patterns 410 included in the light conversion film according to embodiments of the present disclosure.

FIG. 4 illustrates an example of luminance illuminated through a backlight unit according to structures of the light path change patterns 410. Here, EX1 represents an example of luminance measured when the light path change patterns 410 are disposed in a uniform structure, and EX2 represents an example of luminance measured when the light path change patterns 410 are disposed in different structures according to locations.

As shown in the EX1 of FIG. 4, when a light path change pattern 410a disposed in an edge area of the backlight unit and a light path change pattern 410d disposed in a center area thereof have an identical structure to each other, luminance in the edge area of the backlight unit can be represented relatively low.

For example, since the number of light sources providing light to the edge area of the backlight unit is relatively small, when the light path change patterns 410 with light blocking capability of an identical level are disposed, luminance in the edge area can be relatively lowered compared with that in the center area of the backlight unit.

Accordingly, as shown in the EX2 of FIG. 4, when a light path change pattern 410a disposed in the edge area of the backlight unit and a light path change pattern 410d disposed in the center area thereof are disposed to have different structures, it is possible to cause luminance in the edge area of the backlight unit to be prevented from being lowered, and in turn, entire luminance to be uniform.

For example, light path change patterns can be disposed such that a thickness T1 of the light path change pattern 410a disposed in the edge area of the backlight unit is smaller than a thickness T2 of the light path change pattern 410d disposed in the center area of the backlight unit.

In another embodiment, light path change patterns 410 can be disposed such that an area W1 of the thickest portion in a light path change pattern 410b disposed to be adjacent to the edge area of the backlight unit is smaller than an area W2 of the thickest portion in the light path change pattern 410d. For example, the light path change patterns 410 can be disposed such that an area of a portion with a high light blocking capability in a light path change pattern 410a or 410b disposed in the edge area or the area adjacent to the edge area of the backlight unit becomes small.

Further, the light path change patterns 410 can be disposed such that a thickness of the light path change patterns 410 gradually decreases or an area of the thickest portion in the light path change patterns 410 gradually decreases, from the center area toward the edge area of the backlight unit.

Further, in some instances, the number of light sources 240 or a distance between light sources 240 can be disposed to be different in the center area and the edge area of the backlight unit, or different light path change patterns 410 can be disposed in the center area and the edge area of the backlight unit.

FIG. 5 illustrates another structure in which light path change patterns 410 are disposed on the bottom surface of a base film 300.

In this embodiment, a distance between light sources 240 disposed in an edge area of a backlight unit can be smaller than a distance between light sources 240 disposed in a center area of the backlight unit. For example, the light sources 240 in the edge area of the backlight unit can be disposed more tightly so that luminance in the edge area and luminance in the center area of the backlight unit can become uniform.

Further, since the light path change patterns 410 disposed on the bottom surface of the base film 300 are disposed to correspond to light sources 240, the distance between the light path change patterns 410 disposed in the edge area of the backlight unit can be different from the distance between the light path change patterns 410 disposed in the center area of the backlight unit.

For example, a distance D1 in a first direction between light path change patterns 410 disposed in the edge area of the backlight unit can be smaller than a distance D2 in the first direction between light path change patterns 410 disposed in the center area of the backlight unit. Further, a distance D3 in a second direction between the light path change patterns 410 disposed in the edge area of the backlight unit can be smaller than a distance D4 in the second direction between the light path change patterns 410 disposed in the center area of the backlight unit. The first direction may, for example, be perpendicular to the second direction.

Further, a size, a thickness, and the like of a light path change pattern 410 disposed in the edge area of the backlight unit can be different from those of a light path change pattern 410 disposed in the center area of the backlight unit.

For example, as shown in FIG. 5, a size S1 (e.g., a diameter, e.g., a width) of a light path change pattern 410e or 410f disposed in the edge area of the backlight unit can be smaller than a size S2 (e.g., a diameter) of a light path change pattern 410g disposed in the center area of the backlight unit.

In another embodiment, as described above, light path change patterns 410 can have a multiple layer structure, and in this case, a thickness of the light path change pattern 410e or 410f disposed in the edge area of the backlight unit, or an area of a portion in which the light path change pattern 410e or 410f has the greatest thickness can be smaller than a thickness of the light path change pattern 410g disposed in the center area of the backlight unit, or an area of a portion in which the light path change pattern 410g has the greatest thickness.

For example, by configuring the light path change patterns 410e and 410f disposed in the edge area of the backlight unit to have a small size, the light path change patterns 410e and 410f can be disposed to correspond to light sources 240 each of which is disposed in a narrow interval with one another. Accordingly, it is possible to prevent a hot spot from being produced at a location corresponding to a light source 240 in the edge area of the backlight unit.

Further, by lowering a level at which light emitted from a light source 240 in the edge area of the backlight unit is blocked, the backlight unit of the display device according to embodiments of the present disclosure can enable an amount of the light exiting the backlight unit to be increased and luminance degradation in the edge area of the backlight unit to be prevented, and in turn, it is possible to achieve uniform luminance in the entire area of the backlight unit.

Like this, by configuring structures of the light path change patterns 410 to be different for each area of the backlight unit, luminance degradation in the edge area of the backlight unit can be prevented, and luminance uniformity can be improved. Through structures in which the light path change patterns 410 are disposed as described above, it is possible to prevent a hot spot from being produced at the backlight unit and improve luminance uniformity in the entire area of the backlight unit.

Further, according to embodiments of the present disclosure, by changing a structure in which a base film 300 on which the light path change patterns are disposed is disposed, or disposing one or more additional light conversion patterns on the base film 300, a backlight unit can be provided with improved image quality while simplifying configurations, or reducing the number of elements included in the backlight unit and reducing a thickness of the backlight unit.

FIGS. 6 to 10 illustrate further examples of backlight unit structures according to embodiments of the present disclosure.

Figure 6:
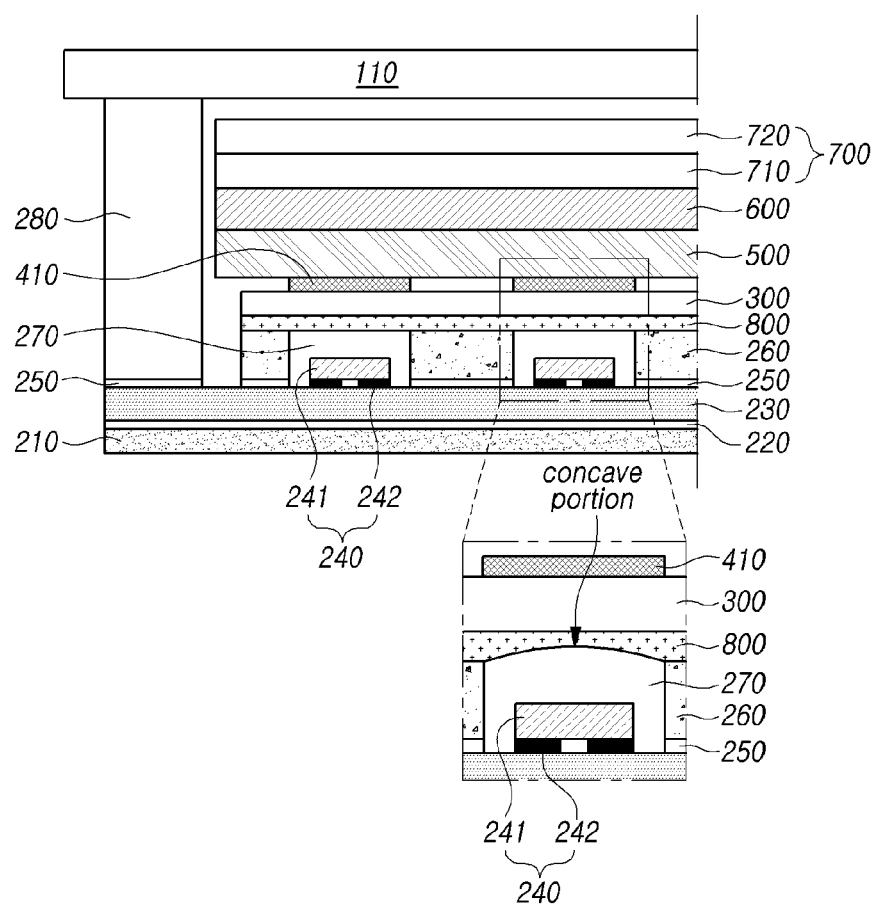
FIGS. 6 to 10 illustrate further examples of backlight unit structures according to embodiments of the present disclosure.

Referring to FIG. 6, one or more light sources 240 can be disposed on a printed circuit 230, and a reflective plate 260 can be disposed in an area except for an area in which the light source 240 is disposed on the printed circuit 230. For example, the reflective plate 260 can be provided with one or more hole, and the light source 240 can be located inside of the hole of the reflective plate 260.

The light source protective element 270 can be disposed inside of the hole of the reflective plate 260, and be disposed to surround an outside surface of the light source 240. Further, light source protective elements 270 located in respective holes adjacent to each other can be disposed to be separated from each other.

A coating layer 800 can be disposed on the light source protective element 270 and the reflective plate 260. For example, the coating layer 800 can be a silicone-based adhesive material. Accordingly, the coating layer 800 can provide not only a function of bonding an optical element disposed on the coating layer 800, but a function of guiding light exiting the light source protective element 270.

A base film 300 can be disposed on the coating layer 800. Further, a light path change pattern 410 can be disposed on the top surface of the base film 300.

As the base film 300 is bonded by the coating layer 800 and disposed on the light source protective element 270 and the reflective plate 260, a function of guiding light emitted from the light source 240 can be provided. Accordingly, the entire thickness of a corresponding backlight unit can be reduced, comparing with a structure in which the light source protective element 270 is disposed on the top surface of the reflective plate 260.

Further, as the light path change pattern 410 is disposed on the top surface of the base film 300, image quality represented by illumination of the backlight unit can be improved by allowing traveling paths of light emitted from a light source 240 to be changed and in turn to be distributed uniformly.

Here, the top surface of the light source protective element 270 contacting the bottom surface of the coating layer 800 can have a convex shape. Further, the light source protective element 270 and the coating layer 800 can directly contact each other, and in this case, an empty space may not be formed between the top surface of the light source protective element 270 and the bottom surface of the coating layer 800. Accordingly, the bottom surface of the coating layer 800 can comprise a concave portion located to correspond to the light source 240.

As the top surface of the light source protective element 270 has the convex shape, it is possible to increase efficiency of allowing light emitted from the light source 240 to be traveled in an upward direction from the light source protective element 270.

Further, by arranging the light source protective element 270 and the coating layer 800 such that an empty space is not formed between them, it is possible to prevent a phenomenon in which light cannot exit out of the light source protective element 270 due to air etc. on a boundary surface between the light source protective element 270 and the coating layer 800.

Further, a diffusion plate 500, a color conversion sheet 600, an optical sheet 700, and the like can be disposed on the base film 300.

Further, in accordance with embodiments of the present disclosure, by disposing one or more patterns capable of converting wavelengths of light on at least one of both surfaces of light path change pattern 410 disposed on the base film 300, a backlight unit is provided without a color conversion sheet 600 that can be included in the backlight unit.

Figure 7:
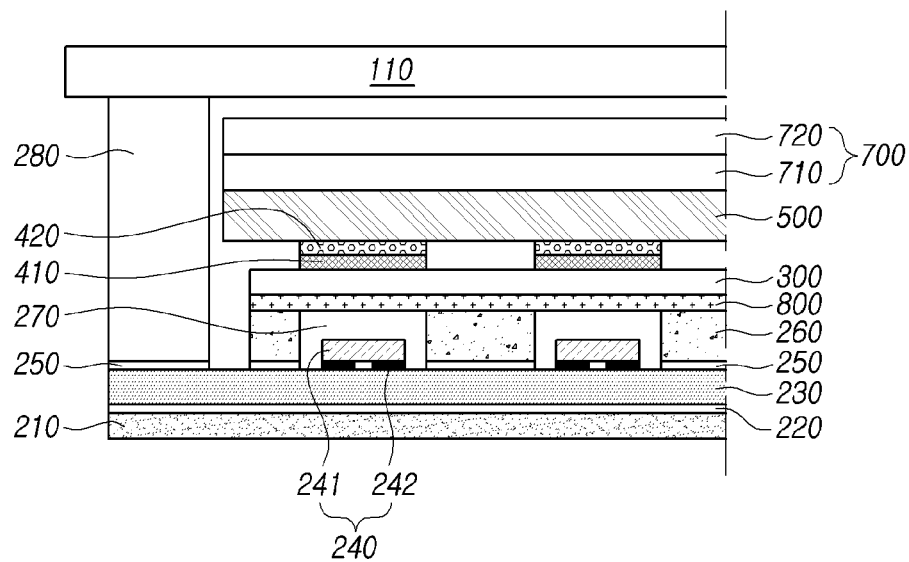

Referring to FIG. 7, a light source 240 can be disposed inside of a hole formed on a reflective plate 260. Further, a light source protective element 270 can be disposed inside of the hole of the reflective plate 260.

A coating layer 800 can be disposed on the light source protective element 270 and the reflective plate 260, and a base film 300 can be disposed on the coating layer 800.

Here, a plurality of light path change patterns 410 can be disposed in an area corresponding to the light source 240 on the top surface of the base film 300. Further, a color conversion pattern 420 can be disposed on each light path change pattern 410. Herein, the color conversion pattern 420 can be referred to as a second light conversion pattern.

The color conversion pattern 420 can be disposed on the light path change pattern 410, and disposed to overlap with the light path change pattern 410. Accordingly, the color conversion pattern 420 can be located in an area corresponding to a light source 240.

Further, in some instances, the color conversion pattern 420 can be disposed on the bottom surface of the base film 300, and/or disposed in an area corresponding to the light source 240. Further, the color conversion pattern 420 can be disposed between the base film 300 and the light path change pattern 410.

The light path change pattern 410 disposed on the base film 300 can change traveling paths of at least some of incident light. For example, by transmitting, reflecting, diffracting or scattering light emitted from the light source 240, the light path change pattern 410 cause the light emitted from the light source 240 to be distributed uniformly.

Further, the color conversion pattern 420 disposed on the light path change pattern 410 causes wavelengths of at least some of the light emitted from the light source 240 to be converted.

For example, when a light source 240 emits blue light, the color conversion pattern 420 can cause green light and red light to be produced in response to the blue light. Accordingly, white light can be provided in the upward direction from the color conversion pattern 420.

Like this, as a pattern for changing traveling paths of light, and a pattern for converting wavelengths of light are disposed on the base film 300 to correspond to a light source 240, a corresponding backlight unit having a simplified structure and uniformly providing white light can be implemented.

For example, by allowing the base film 300 provided with a light guide function to be disposed to be bonded on the light source protective element 270 and the reflective plate 260, it is possible to reduce a thickness of a portion of the corresponding backlight unit in which light emitted from the light source 240 is initially guided.

Further, by disposing the color conversion pattern 420 on the base film 300, together with the light path change pattern 410, it is possible to remove one or more optical elements, such as a color conversion sheet 600, and the like. Further, by allowing the color conversion pattern 420 to be located in an area in which light with the strongest intensity is placed, white light can be implemented even when a color conversion material is not disposed in the entire area of a backlight unit.

Since the light path change pattern 410 and color conversion pattern 420 disposed on the base film 300 have different functions from each other, they can be therefore disposed to have different areas over the light source 240.

Figure 8:
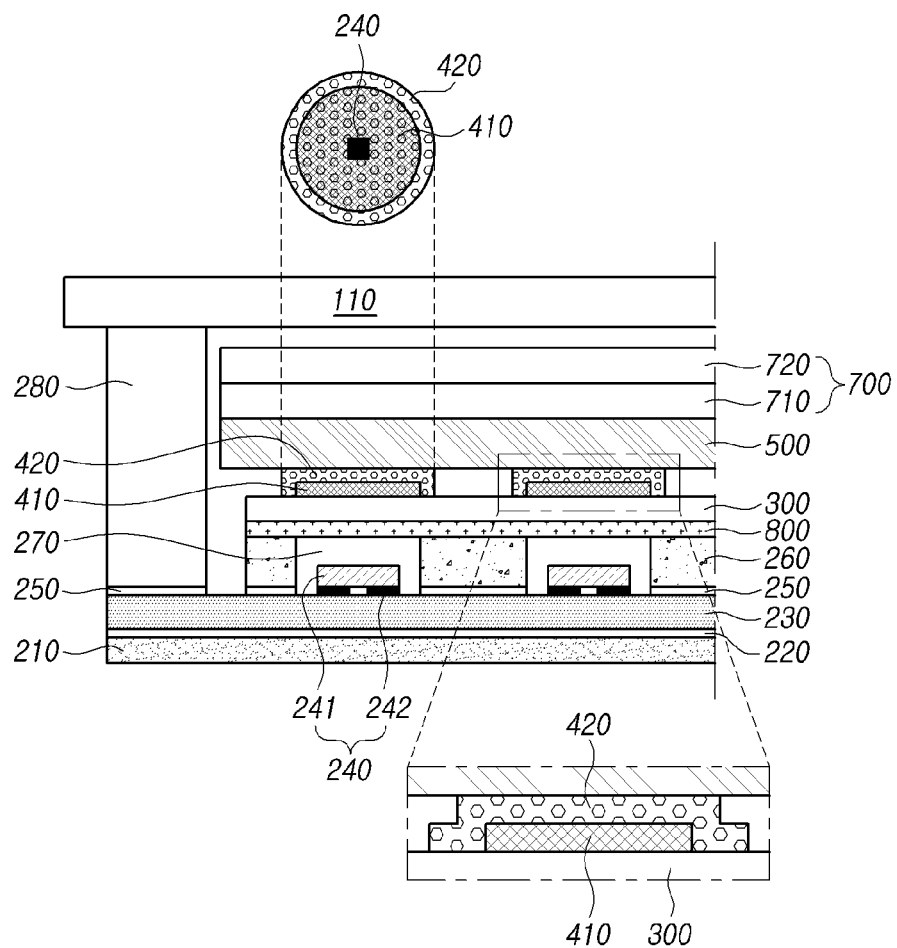

Referring to FIG. 8, a coating layer 800 can be disposed on a light source protective element 270 disposed to surround a light source 240, and a reflective plate 260. Further, a base film 300 can be disposed on the coating layer 800.

A light path change pattern 410 and a color conversion pattern 420 can be disposed on the base film 300. Further, the light path change pattern 410 and the color conversion pattern 420 can be located in an area corresponding to the light source 240.

Here, an area of the light path change pattern 410 can be different from that of the color conversion pattern 420.

For example, the color conversion pattern 420 can be disposed in an area greater than the light path change pattern 410.

Since the light path change pattern 410 is needed to change traveling paths of light in an area in which light emitted from the light source 240 has the strongest intensity, the light path change pattern 410 can be disposed in a specific area according to an intensity of light emitted from the light source 240, a distance from the light source 240, and the like.

Further, since the color conversion pattern 420 is needed to convert sufficiently some of light of a specific wavelength band which is emitted from the light source 240 to light of another wavelength band, the color conversion pattern 420 can be therefore disposed in an area broader than the light path change pattern 410. Accordingly, an end of the color conversion pattern 420 can be located outside of an end of the light path change pattern 410.

When the color conversion pattern 420 is disposed on the light path change pattern 410 in an area broader than the light path change pattern 410, as shown in FIG. 8, the color conversion pattern 420 can be disposed to surround one or more outside surfaces of the light path change pattern 410, such as at least one of one or more side surfaces, and the top surface of the light path change pattern 410, and the like.

Further, when the color conversion pattern 420 is disposed between the light path change pattern 410 and the base film 300, one or more ends of the light path change pattern 410 can be located inside of one or more ends of the color conversion pattern 420. For example, the light path change pattern 410 and the color conversion pattern 420 can be disposed such that the light path change pattern 410 is placed within the color conversion pattern 420.

Like this, by allowing the light path change pattern 410 and the color conversion pattern 420 to be disposed in different areas, respective functions of the light path change pattern 410 and the color conversion pattern 420 can be performed efficiently.

Further, in some instances, even when the color conversion pattern 420 is disposed on the base film 300, a color conversion sheet 600 can be disposed on the light conversion film.

Figure 9:
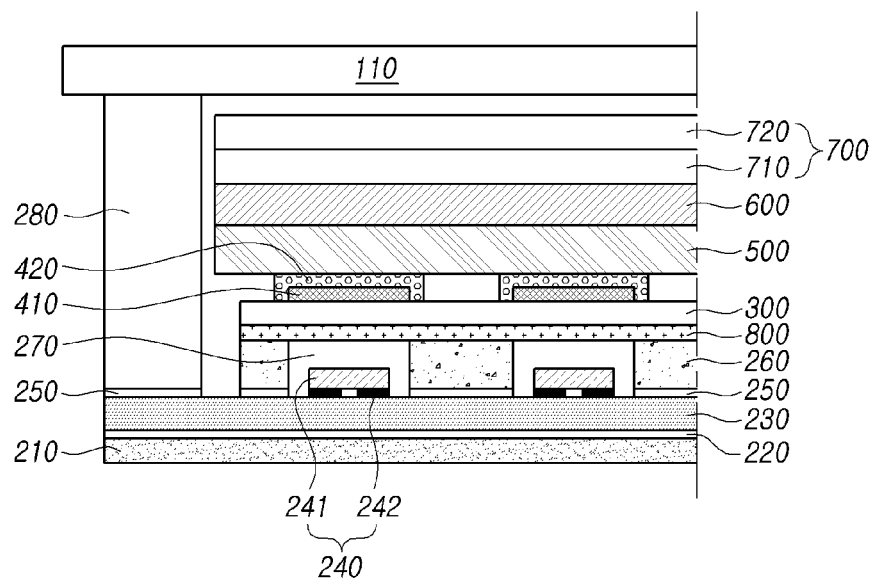

Referring to FIG. 9, a light conversion film can be disposed over a light source 240. Further, the light conversion film can include a base film 300, and a light path change pattern 410 and a color conversion pattern 420 disposed on the base film 300.

Optical elements, such as a diffusion plate 500, an optical sheet 700, and the like, can be disposed on the light conversion film, and in some instances, a color conversion sheet 600 can be disposed on the light conversion film.

Even when the light conversion film is provided with the color conversion pattern 420, by allowing the color conversion sheet 600 to be disposed, it is possible to improve capability of a corresponding backlight unit for producing white light.

Further, in this case, content of a color conversion material included in the color conversion pattern 420 and content of a color conversion material included in the color conversion sheet 600 can be different.

Further, in an equal size of area, the content of a color conversion material included in the color conversion pattern 420 can be greater than the content of a color conversion material included in the color conversion sheet 600.

For example, by placing a color conversion pattern in which a color conversion material is contained at a high density in an area in which light with the strongest intensity is placed, the conversion of a wavelength of light can be sufficiently performed.

Further, by disposing the color conversion sheet 600 in which a color conversion material is contained at a low density on the light conversion film, it is possible to convert one or more wavelengths of some light which travels toward an area between light sources 240 and has not been converted to one or more other wavelengths, and thus, improve capability of producing white light.

Alternatively, by disposing a sheet having reflectance responsive to light of a specific wavelength band on the light conversion film, it is also possible to improve capability of producing white light.

Figure 10:
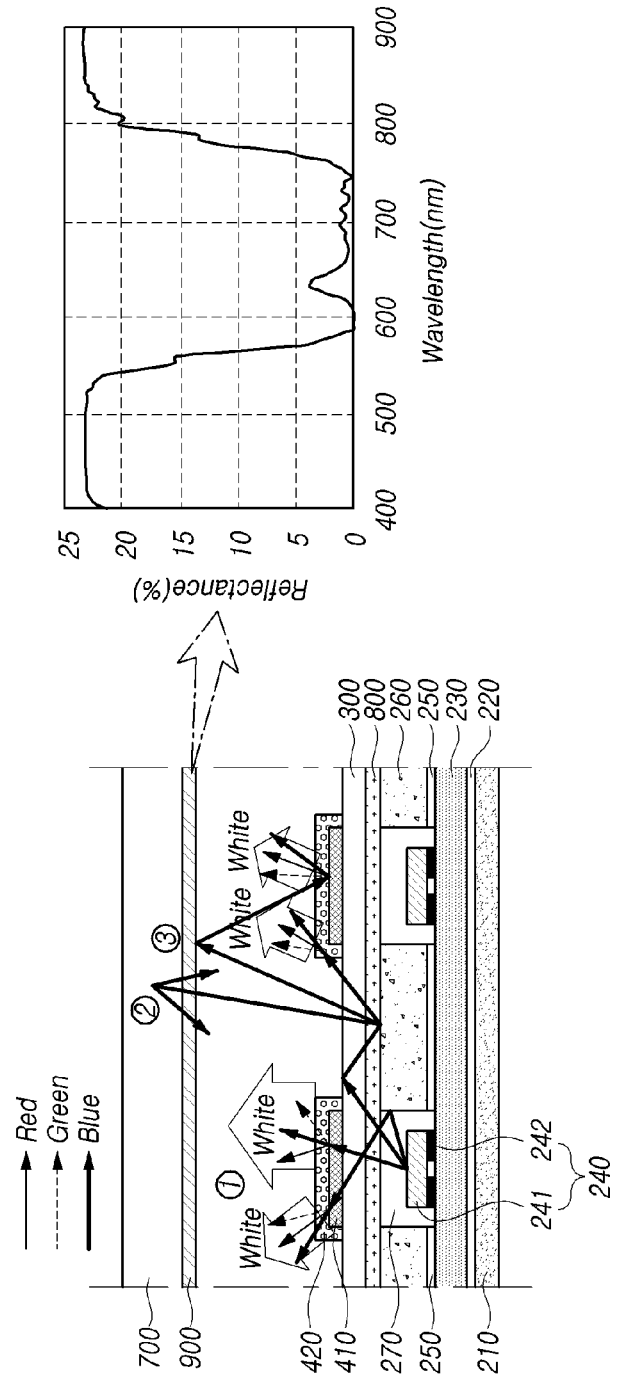

Referring to FIG. 10, for example, a light source 240 can emit blue light. As indicated by symbol ① in FIG. 10, some of the blue light emitted from the light source 240 can be converted to green light and red light by a color conversion pattern 420 of a base film 300. Accordingly, white light can be provided through the color conversion pattern 420 on the base film 300.

Here, some light that has not been converted to one or more other wavelengths can travel in the upward direction from a light conversion film through an area between light sources 240.

As indicated by symbol ② in FIG. 10, some of such blue light can be reflected or scattered by an optical sheet 700 located on light conversion film. For example, the optical sheet 700 can reflect or scatter some of incident light in order to improve luminous efficiency. At this time, as some of the blue light reaching the optical sheet 700 is reflected or scattered, the reflected or scattered blue light is recycled and in turn, white light can be produced through the recycling.

Alternatively, by disposing a reflective sheet 900 with a predetermined reflectance responsive to the blue light, the blue light can be recycled.

For example, as shown in FIG. 10, a reflective sheet 900 with a certain reflectance (e.g., about 23%) responsive to light of a blue wavelength band can be located on the light conversion film.

As indicated by symbol ③ in FIG. 10, such a reflective sheet 900 can reflect some of blue light. Further, the reflective sheet 900 can allow some of blue light to transmit. Further, the reflective sheet 900 can allow green light and red light to transmit.

Thus, some of the blue light that has not been converted to the green light and the red light by the color conversion pattern 420 can be reflected in the downward direction from the reflective sheet 900. The reflected blue light can be converted to green light or red light in the process in which the reflected blue light is recycled.

Like this, by disposing the color conversion pattern 420 on the base film 300 for allowing white light to be produced, and disposing an optical element for allowing some of blue light to be recycled, it is possible to produce white light while reducing an area in which a color conversion material is disposed.

Like this, in accordance with embodiments of the present disclosure, by providing a light conversion film on which the light path change pattern 410 and the color conversion pattern 420 are disposed on at least one surface of the base film 300, a backlight unit allowing white light to be provided uniformly can be provided with a simplified configuration.

Further, the light path change pattern 410 and the color conversion pattern 420 disposed on the base film 300 can be disposed in various structures.

Figure 11:
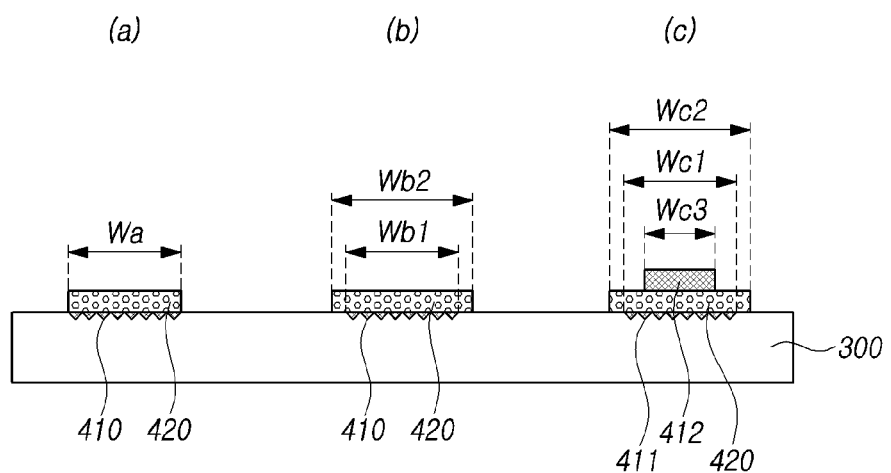
FIGS. 11 to 13 illustrate further examples of light conversion films according to embodiments of the present disclosure.
Figure 12:
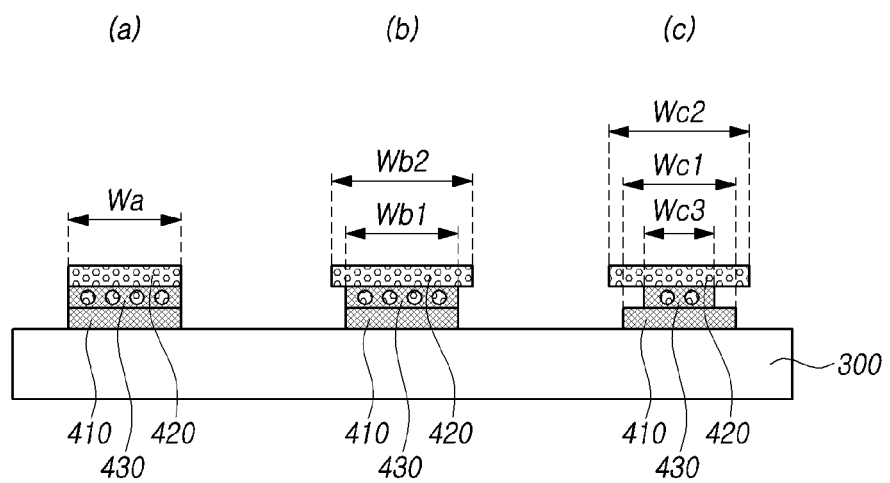
Figure 13:
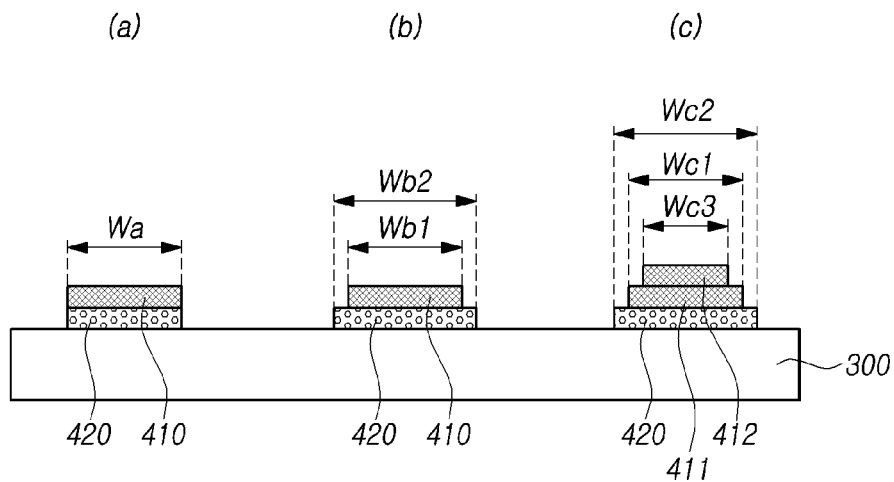

FIGS. 11 to 13 illustrate further examples of light conversion films according to embodiments of the present disclosure.

Referring to FIG. 11, as described above, a light path change pattern 410 can be disposed using a method of printing a light blocking material on a base film 300, or implemented by a method of forming an engraved pattern on a surface of the base film 300.

For example, a light path change pattern 410 can be realized by allowing light to be transmitted, reflected, diffracted, or scattered through an engraved pattern formed on the top surface of the base film 300. Alternatively, such a light path change pattern 410 can be implemented by disposing a light blocking material inside of an engraved pattern formed on the base film 300.

Further, a color conversion pattern 420 can be disposed on the light path change pattern 410.

As the color conversion pattern 420 is disposed in a state where the light path change pattern 410 is formed on the base film 300 using the engraved pattern, the entire thickness of an associated light conversion film can be reduced.

The color conversion pattern 420 can be disposed to overlap with the light path change pattern 410. Further, a structure in which the color conversion pattern 420 overlaps with the light path change pattern 410 can be formed variously.

For example, as shown in (a) of FIG. 11, a light path change pattern 410 and a color conversion pattern 420 can be disposed to have an identical width Wa (or an area).

In another example, as shown in (b) of FIG. 11, a width Wb1 of a light path change pattern 410 can be smaller than a width Wb2 of a color conversion pattern 420.

In further another example, as shown in (c) of FIG. 11, a color conversion pattern 420 with a width Wc2 can be disposed on a first light path change pattern 411 with a width Wc1. Further, a second light path change pattern 412 with a width Wc3 being narrower than the width Wc2 of the color conversion pattern 420 can be further disposed on the color conversion pattern 420. For example, Wc3 may be smaller than Wc1, and Wc1 may be smaller than Wc2. When the light path change pattern 410 is needed to have a greater light blocking capability due to a reduced thickness of a corresponding backlight unit or high luminance of a light source 240, it is possible to enhance the associated light path change capability by further disposing, on the color conversion pattern 420, the second light path change pattern 412 with a width narrower than the first light path change pattern 411.

Alternatively, to enhance both the light path change capability and the color conversion capability, one or more pattern(s) capable of providing these two capabilities can be further disposed.

Referring to FIG. 12, a light conversion film can include a light path change pattern 410 and a color conversion pattern 420, disposed on a base film 300. Further, an auxiliary color conversion pattern 430 can be disposed between the light path change pattern 410 and the color conversion pattern 420. Herein, the auxiliary color conversion pattern 430 can be referred to as a third light conversion pattern.

For example, the auxiliary color conversion pattern 430 can be formed of a light blocking material containing a color conversion material. Accordingly, the auxiliary color conversion pattern 430 can support the light path change pattern 410 and the color conversion pattern 420 by providing both the light path change function and the color conversion function.

As shown in (a) of FIG. 12, the auxiliary color conversion pattern 430 can be disposed to have an identical width Wa to the light path change pattern 410 and the color conversion pattern 420.

In another example, as shown in (b) of FIG. 12, when the color conversion pattern 420 is disposed to have a width Wb2 broader than a width Wb1 of the light path change pattern 410, the auxiliary color conversion pattern 430 can be disposed to have an identical width to the light path change pattern 410.

In further another example, as shown in (c) of FIG. 12, the auxiliary color conversion pattern 430 can be disposed to have a width Wc3 being narrower than the width Wc1 of the light path change pattern 410 or the width Wc2 of the color conversion pattern 420.

Such a relative width of the auxiliary color conversion pattern 430 can be variously set according to capabilities of the auxiliary color conversion pattern 430 and an extent to which the auxiliary color conversion pattern 430 supports. For example, Wc3 may be smaller than Wc1, and Wc1 may be smaller than Wc2, as shown.

Further, a stacking order of the light path change pattern 410 and the color conversion pattern 420 included in the light conversion film can be variously determined.

Referring to FIG. 13, a color conversion pattern 420 can be disposed on a base film 300, and a light path change pattern 410 can be disposed on the color conversion pattern 420.

As shown in (a) of FIG. 13, a light path change pattern 410 and a color conversion pattern 420 can be disposed to have an identical width Wa. Further, wavelengths of light can be converted by the color conversion pattern 420, and traveling paths of light can be controlled by the light path change pattern 410.

In another example, as shown in (b) of FIG. 13, a width Wb1 of a light path change pattern 410 can be smaller than a width Wb2 of a color conversion pattern 420.

In further another example, as shown in (c) of FIG. 13, a color conversion pattern 420 can be disposed to have a width Wc2. Further, a first light path change pattern 411 with a width Wc1 smaller than that of the color conversion pattern 420 and a second light path change pattern 412 with a width Wc3 smaller than that of the first light path change pattern 411 can be disposed on the color conversion pattern 420. The first light path change pattern 411 may be disposed on the color conversion pattern 420, and the second light path change pattern 412 may be disposed on the first light path change pattern 410, as shown.

For example, the light path change pattern 410 can include a first layer and a second layer which have different widths (or areas). Further, as the color conversion pattern 420 is disposed to be broader than the first light path change pattern 411 and the second light path change pattern 412, the light path change pattern 410 with such a multiple layer structure can be disposed stably.

In addition to the embodiments and examples described above, locations, areas, or the like of a light path change pattern 410 and a color conversion pattern 420 can be variously determined according to a location or a structure in which a light conversion film is disposed in a backlight unit, a distance between the light conversion film and a light source 240, an intensity of light emitted from the light source 240, or the like.

In according to the embodiments of the present disclosure described above, by allowing a light path change pattern 410 and a color conversion pattern 420 to be disposed in an area corresponding to a light source 240, it is possible to provide a backlight unit capable of uniformly producing white light by a simplified configuration.

Further, as a base film 300 on which the light path change pattern 410 and the color conversion pattern 420 are disposed on a light source protective element 270 and a reflective plate 260, provides a light guide capability, it is possible to minimize a thickness of the backlight unit and improve image quality presented by the illumination of the backlight unit.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. For example, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A backlight unit comprising:
    a plurality of light sources disposed on a printed circuit;
    one or more light source protective elements located on at least one of the plurality of light sources;
    a reflective plate disposed on the printed circuit and including a plurality of holes, each of the plurality of holes located to correspond to a respective one of the plurality of light sources, wherein each of the one or more light source protective elements is disposed inside a respective one of the plurality of holes included in the reflective plate;
    a base film located on the one or more light source protective elements;
    a plurality of first light conversion patterns that are disposed on at least one of both surfaces of the base film and located in respective areas corresponding to the plurality of light sources, and have a predetermined reflectance, and change traveling paths of at least some of incident light by reflecting the at least some of incident light; and
    a plurality of second light conversion patterns that are disposed on at least one of both surfaces of the first light conversion patterns and convert wavelengths of at least some of incident light.

2. The backlight unit according to claim 1, wherein the plurality of second light conversion patterns are disposed in areas including areas overlapping the plurality of first light conversion patterns.

3. The backlight unit according to claim 1, wherein an end of each of the plurality of second light conversion patterns is located outside of an end of each of the plurality of first light conversion patterns, respectively.

4. The backlight unit according to claim 1, wherein the plurality of first light conversion patterns are located between the base film and the plurality of second light conversion patterns.

5. The backlight unit according to claim 1, wherein the plurality of second light conversion patterns are located between the base film and the plurality of first light conversion patterns.

6. The backlight unit according to claim 1, wherein the plurality of first light conversion patterns are disposed in a form of being engraved on a surface of the base film, and the plurality of second light conversion patterns are located on the plurality of first light conversion patterns.

7. A backlight unit comprising:
    a plurality of light sources disposed on a printed circuit;
    one or more light source protective elements located on at least one of the plurality of light sources;
    a base film located on the one or more light source protective elements;
    a plurality of first light conversion patterns that are disposed on at least one of both surfaces of the base film and located in respective areas corresponding to the plurality of light sources, and change traveling paths of at least some of incident light;
    a plurality of second light conversion patterns that are disposed on at least one of both surfaces of the first light conversion patterns and convert wavelengths of at least some of incident light; and
    a plurality of third light conversion patterns located between the plurality of first light conversion patterns and the plurality of second light conversion patterns, and formed of a material in which a material forming the plurality of first light conversion patterns and a material forming the plurality of second light conversion patterns are mixed.

8. The backlight unit according to claim 1,
    wherein two of the light source protective elements respectively disposed in two adjacent holes of the plurality of holes are disposed to be separated from each other.

9. The backlight unit according to claim 8, wherein the plurality of first light conversion patterns and the plurality of second light conversion patterns are disposed on a top surface of the base film, and
    wherein a bottom surface of the base film is bonded with top surfaces of the one or more light source protective elements and the reflective plate.

10. The backlight unit according to claim 9, wherein the top surface of the one or more light source protective elements has a convex shape.

11. The backlight unit according to claim 1, further comprising a reflective sheet located on the base film and reflecting some of light of at least some of wavelength bands of light emitted from at least one of the light sources.

12. The backlight unit according to claim 11, where the reflective sheet allows, to transmit, light of one or more wavelength bands which is not emitted from the at least one of the light sources.

13. A backlight unit comprising:
    a plurality of light sources disposed on a printed circuit;
    one or more light source protective elements located on at least one of the plurality of light sources;
    a reflective plate disposed on the printed circuit and including a plurality of holes, each of the plurality of holes located to correspond to a respective one of the plurality of light sources, wherein each of the one or more light source protective elements is disposed inside a respective one of the plurality of holes included in the reflective plate;
    a base film located on the one or more light source protective elements;

a plurality of first light conversion patterns located in respective areas corresponding to the plurality of light sources on at least one of both surfaces of the base film, the plurality of first light conversion patterns having a predetermined reflectance, and the plurality of first light conversion patterns being configured to change traveling paths of at least some of incident light by reflecting the at least some of incident light; and a plurality of second light conversion patterns located in respective areas corresponding to the plurality of light sources on at least one of both surfaces of the base film, and configured to convert one or more wavelengths of at least some of incident light.

14. The backlight unit according to claim 13, wherein the plurality of second light conversion patterns overlap the plurality of first light conversion patterns, respectively.

15. The backlight unit according to claim 13, wherein an area of each of the plurality of second light conversion patterns is greater than an area of each of the plurality of first light conversion patterns, respectively.

16. A display device comprising:
the backlight unit according to claim 13; and
a panel disposed over the backlight unit and configured to receive light from the backlight unit.

17. A light conversion film comprising:
a base film;
a plurality of first light conversion patterns distributed and coplanarly disposed separately on at least one of both surfaces of the base film, the plurality of first light conversion patterns having a predetermined reflectance, and the plurality of first light conversion patterns being configured to change traveling paths of at least some of incident light transmitted through the base film by reflecting the at least some of incident light; and a plurality of second light conversion patterns disposed on and located separately to correspond to a respective at least one of both surfaces of the first light conversion patterns, and configured to convert one or more wavelengths of at least some of incident light.

18. The light conversion film according to claim 17, wherein the plurality of first light conversion patterns are located between the base film and the plurality of second light conversion patterns, and wherein the plurality of second light conversion patterns are disposed to contact and surround an outside surface of the plurality of first light conversion patterns, respectively.

19. The light conversion film according to claim 17, wherein the plurality of second light conversion patterns are located between the base film and the plurality of first light conversion patterns, and are in contact with the base film and the plurality of first light conversion patterns, respectively, and wherein an end of each of the plurality of second light conversion patterns is located outside of an end of each of the plurality of first light conversion patterns, respectively.

20. The light conversion film according to claim 19, wherein the plurality of first light conversion patterns include:
a first layer located on the plurality of second light conversion patterns, and
a second layer located on the first layer and located inside of an end of the first layer.

* * * * *